(12) United States Patent
Stevens

(10) Patent No.: US 6,868,316 B1
(45) Date of Patent: Mar. 15, 2005

(54) SATELLITE CONSTELLATION SYSTEM

(75) Inventor: Craig W. Stevens, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/394,460

(22) Filed: Mar. 21, 2003

Related U.S. Application Data
(60) Provisional application No. 60/366,306, filed on Mar. 21, 2002.

(51) Int. Cl.$^7$ .............................................. G05D 1/00
(52) U.S. Cl. ...................................... 701/13; 244/171
(58) Field of Search ....................... 701/13; 244/158 R, 244/164, 171

(56) References Cited

U.S. PATENT DOCUMENTS

| | | | | |
|---|---|---|---|---|
| 5,574,660 A | | 11/1996 | Diekelman | 364/514 |
| 5,657,323 A | * | 8/1997 | Jan et al. | 370/252 |
| 5,722,042 A | | 2/1998 | Kimura et al. | 455/13.1 |
| 5,911,389 A | | 6/1999 | Drake | 244/158 |
| 5,925,092 A | | 7/1999 | Swan et al. | 701/226 |
| 5,999,127 A | | 12/1999 | Dezelan | 342/359 |
| 6,002,360 A | | 12/1999 | Wolcott et al. | 342/354 |
| 6,050,525 A | | 4/2000 | Drake | 244/158 |
| 6,073,011 A | * | 6/2000 | Horstein | 455/427 |
| 6,122,596 A | | 9/2000 | Castiel | 701/226 |
| 6,333,924 B1 | | 12/2001 | Porcelli et al. | 370/331 |
| 6,336,612 B1 | | 1/2002 | Taormina et al. | 244/158 |

OTHER PUBLICATIONS

L. Rider Analytic Design of Satellite Constellations for Zonal Earth Coverage Using Inclined Circular Orbits The Journal of the Astronautical Sciences, vol. 34, No. 1 Jan.–Mar. 1986 pp. 31–64.

D.C. Beste Design of Satellite Constellations for Optimal Continuous Coverage IEEE Transactions on Aerospace and Electronic Systems AES–14, No. 3, May 1978 pp. 466–473 + 2 pp Illustrations.

A.H. Ballard Rosette Constellations of Earth Satellites IEEE Transactions on Aerospace and Electronic Systems vol. AES–16, No. 5, Sep. 1980 pp 656–673.

J.G. Walker Continuous Whole–Earth Coverage by Circular–Orbit Satellite Patterns Royal Aircraft Establishment, Technical Report 77044, Rec'd for Printing Mar. 24, 1977.

* cited by examiner

*Primary Examiner*—Marthe Y. Marc-Coleman
(74) *Attorney, Agent, or Firm*—Marsh Fischmann & Breyfogle LLP

(57) ABSTRACT

A satellite constellation system, including a plurality of satellites in relatively close proximity to each other so that line-of-sight communications can be maintained at all times between adjacent satellites. The satellites are in closely-spaced orbits with incremental offsets in their starting true anomalies to create a pattern of the satellites which is serpentine in nature, moving north and south through latitudes covered as a result of the selected inclination angle while moving also in a longitudinal direction so that the serpentine pattern moves across most ground regions of interest. The constellation is asymmetric in nature in order to maximize the continuous access time. It is also possible to have multiple symmetrically-located constellations of this type.

30 Claims, 7 Drawing Sheets

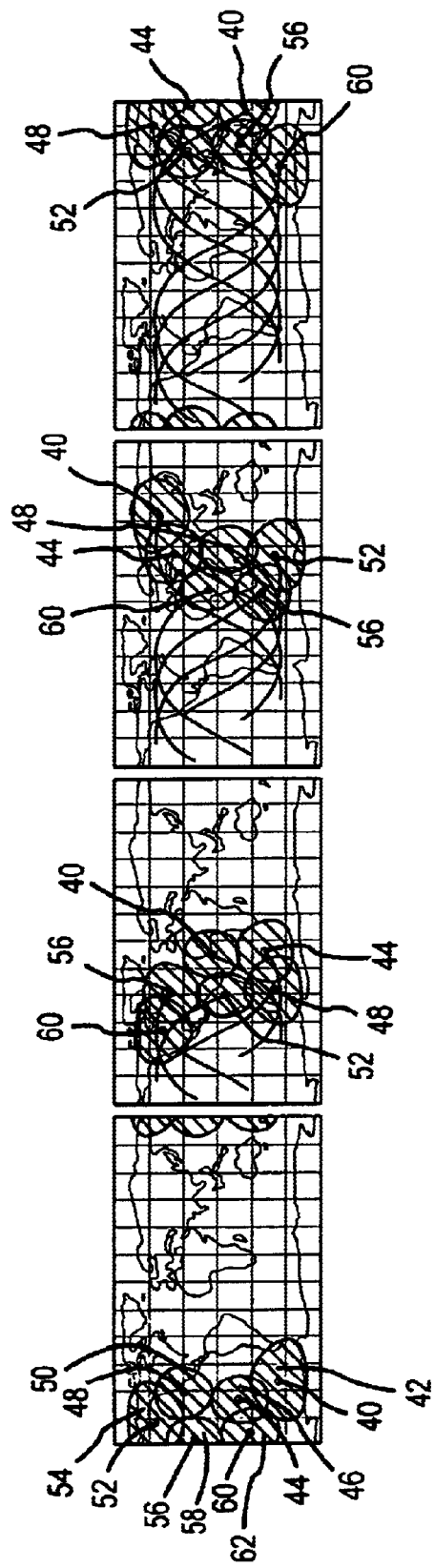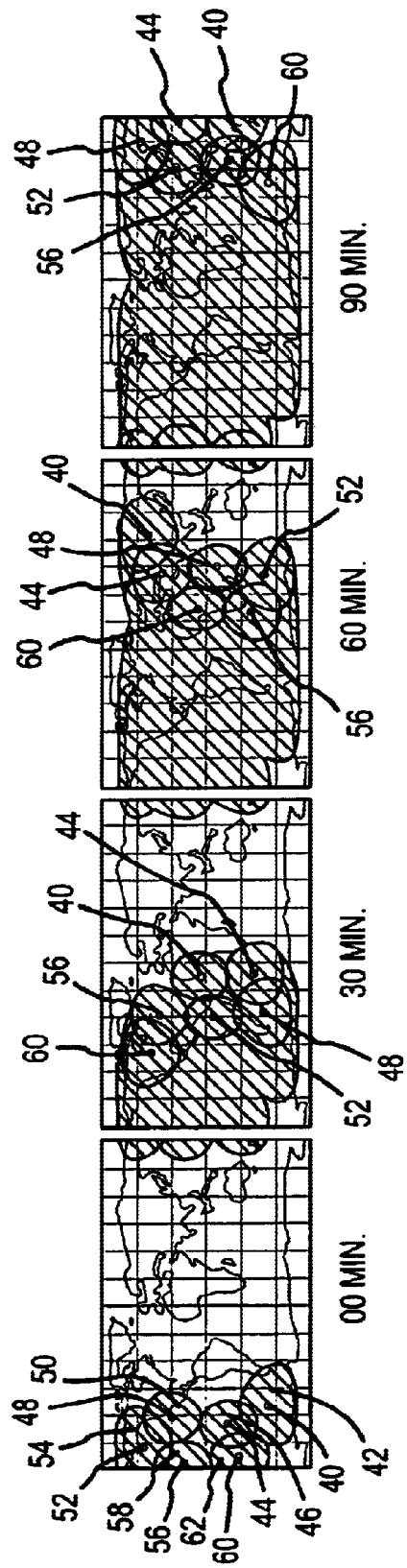

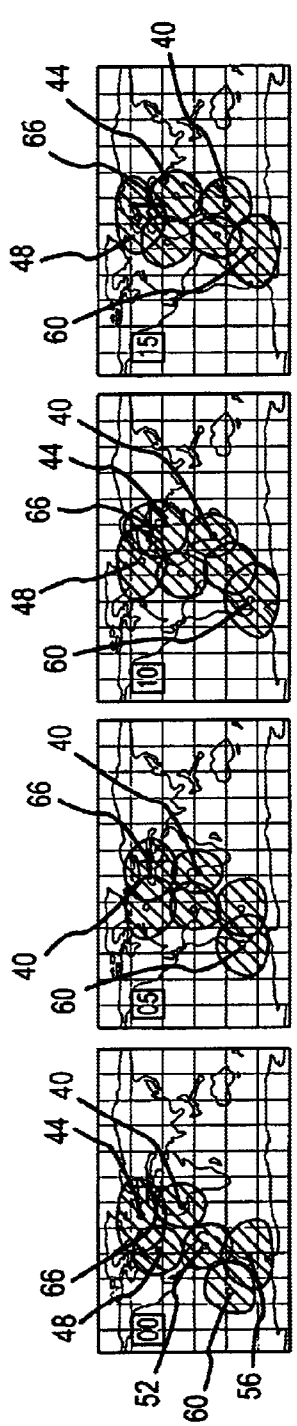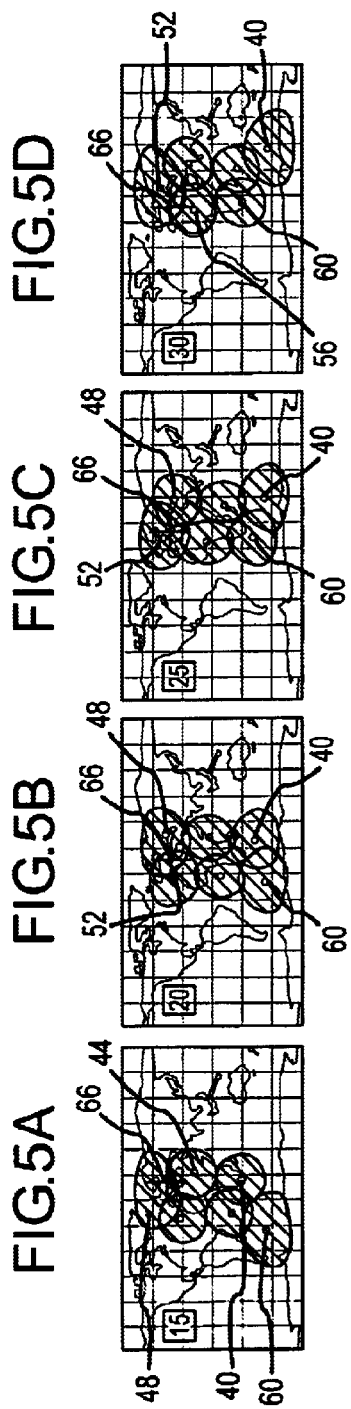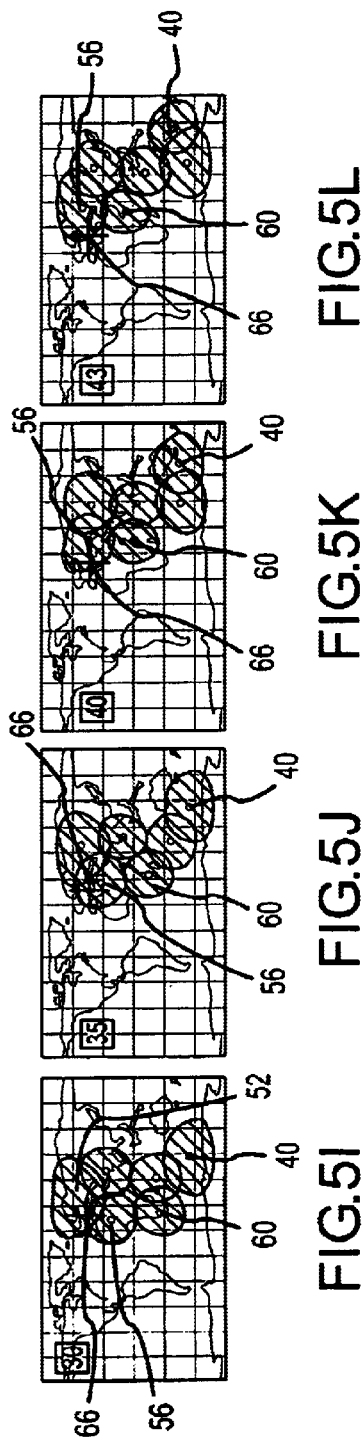

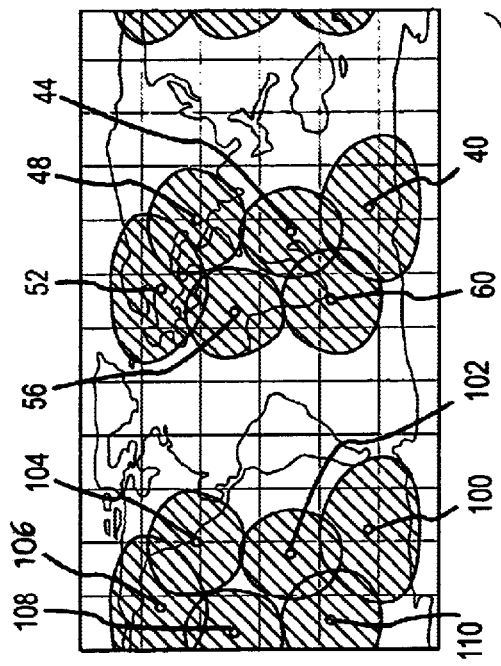
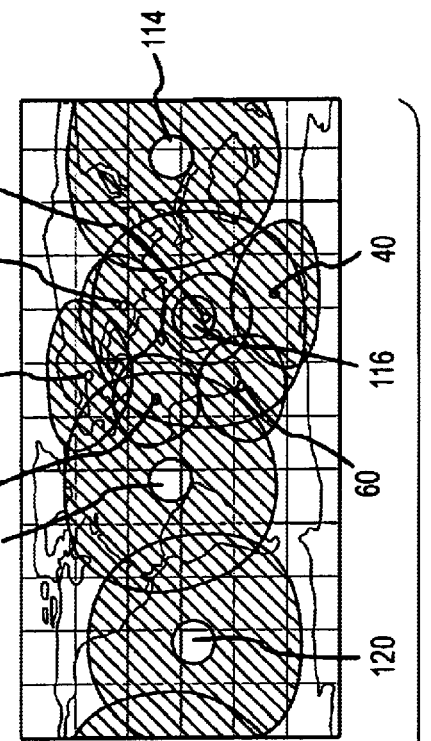
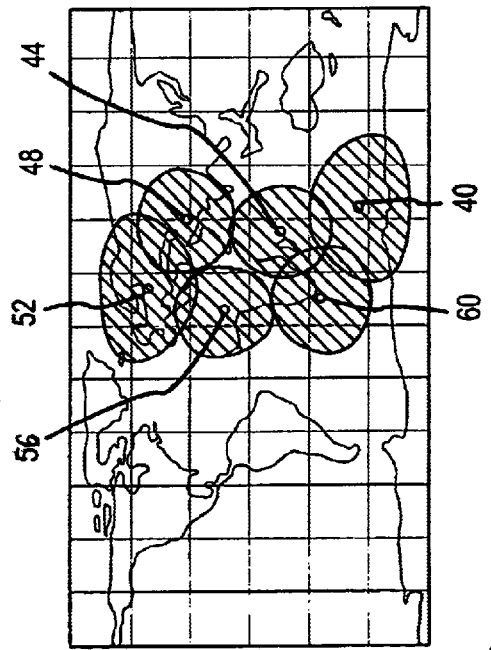
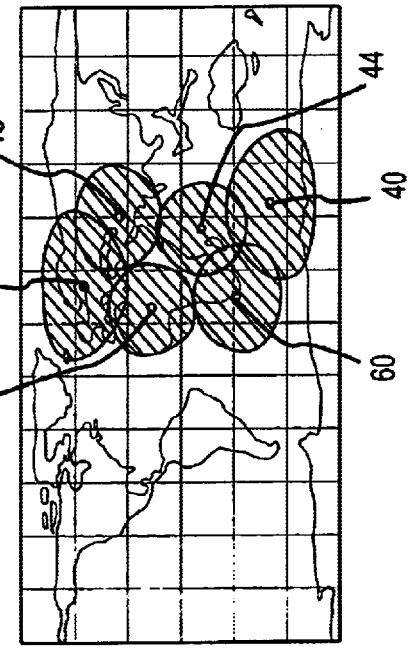
FIG. 8
FIG. 9

SATELLITE CONSTELLATION SYSTEM

CROSS-REFERENCE TO RELATED APPLICATIONS

This application claims priority from U.S. Provisional Patent Application No. 60/366,306, filed Mar. 21, 2002, entitled "WOLFPACK SATELLITE POSITIONING SCHEME", the contents of which are incorporated herein by reference.

FIELD OF THE INVENTION

The present invention relates generally to constellations of man-made satellites, and more particularly to asymmetrical constellations of man-made satellites that allow for extended access to a ground point.

BACKGROUND OF THE INVENTION

Man-made satellites orbiting around the earth are typically categorized as being in one of a geosynchronous earth orbit (GEO), a medium earth orbit (MEO), a low earth orbit (LEO), or a highly elliptical earth orbit (HEO). Each of these types of orbits has particular advantages and disadvantages, which take on relatively different importance depending on the application for which the satellite is being used.

GEOs have the advantage that the satellite orbits at generally the same angular rate around the earth as the earth is rotating (approximately one orbit every 24 hours), so that the satellite appears to hover over a given ground point on the earth. This is achieved in part by having the satellite orbit near the earth's equator and being approximately 36,000 km above the earth. The GEO satellite has access a large area on the earth, due to its high altitude. This area is known as the field of regard (FOR). One disadvantage of GEO satellites is that it is much more expensive to launch the satellite to the necessary GEO altitude as compared to satellites at lower altitudes. Another disadvantage is that a sensor deployed on a GEO satellite would have to be more capable than its LEO counterpart to maintain the desired accuracies over the longer ranges.

LEO satellites generally reside less than about 2500 km above the earth, and have an orbital period of 1.5 to 2 hours and can fly in either circular or elliptical orbits around the earth. LEO satellites generally have opposite advantages and disadvantages as compared to GEO satellites. An LEO satellite can more easily obtain higher resolution due to its closer proximity to the earth, and is less expensive to launch for the same reason. One of the strong characteristics of LEO satellites is that they are not stationary relative to ground points. This characteristic has several implications, including the fact that a given satellite can only access a given point on the earth for a limited time duration (known as the access time). In addition, there is a gap in time until the satellite can see the same ground point again (known as the gap time). Further, LEO satellites have a much smaller FOR than GEO satellites.

MEO satellites have less extreme advantages and disadvantages than the GEO and LEO satellites described above, since they are at an intermediate altitude. MEO satellites generally are located between LEO and GEO altitudes and have an orbital period of 2–24 hours. These satellites have larger FOR and longer access times than LEO satellites, with higher resolution and more power and antenna requirements, and are less expensive to launch than GEO satellites.

Highly eccentric orbits (HEO) typically have perigee altitudes in the LEO regime and apogee altitudes above GEO ranges. Due to the wide variations in altitude as the satellite moves from its lowest altitude (perigee) to its highest altitude (apogee), its sensors are typically designed to operate about the apogee position (where the satellite spends most of its time). This type of orbit can provide long periods of local access at higher latitudes than are normally achieved from GEO.

Most work to date with satellite constellations has related to providing continuous access from the satellite constellation to a given ground point. In different approaches, this may include global access, polar-cap access, or zonal access within specific latitude bands. Providing continuous access can be very expensive, however, as many satellites can be required. The exact number of satellites required is a function of the altitude of the satellites and latitude of the area for which continuous access is required. For example, since a GEO satellite may have an FOR that covers 40% of the earth's surface, three different GEO satellites spaced 120° apart from the earth's equator can together see a large percentage of the earth's surface. Most importantly, the typical approaches for providing continuous access use an equally-spaced, symmetric pattern around the earth.

Because the number of LEO satellites required to provide continuous access to a given ground spot are so high, satellite constellations designed for LEO satellites are often focused on reducing the gap time between when sequential satellites can see a given ground point. Unfortunately, by distributing a limited number of satellites in a symmetric pattern to minimize gap times, access is limited to the duration that a single satellite can see a given ground point. While this approach may be desirable in many applications, there are other applications in which increasing the contiguous access time is an important objective. For example, in a low earth orbit, a typical satellite may only have access to a given ground point for a 15-minute period of time. Therefore, if it is desired to continuously monitor a given ground point for a longer period of time (for example, 30 minutes), it may not be possible unless an entirely populated, symmetrical constellation is provided with a great number of satellites to provide continuous access. In addition to a satellite having extended access to a ground target, it may also be desirable for a given satellite to have an extended duration of communication to a ground-based communication site.

Another type of satellite grouping is known as a cluster. Satellite clusters typically include a plurality of satellites traveling together in close proximity within the same or very closely spaced orbit plane. The FOR of each of the satellites may almost entirely overlap each other. Clusters may be used so that each of the satellites in the cluster can have a different function or capability, for example.

It is against this background and with a desire to improve on the prior art that the present invention has been developed.

SUMMARY OF THE INVENTION

In view of the foregoing, a broad objective of the present invention is to increase the continuous access time of satellite constellations. Another objective of the present invention is to increase the continuous access time of asymmetrical satellite constellations. A further objective is to increase the continuous access time of asymmetrical satellite constellations with a relatively small number of satellites.

In carrying out these and other objectives, features, and advantages of the present invention, a satellite constellation is provided that includes a plurality of man-made satellites that are asymmetrically located relative to a celestial body along a plurality of orbits located at a substantially common altitude and having a substantially common inclination relative to a reference circle about the celestial body, each respective satellite having a starting true anomaly that is incrementally offset from the satellite in the next adjacent orbit, each satellite being at all times within line-of-sight of the satellite in the next adjacent orbit. Each of the plurality of satellites appear to follow the satellite in the next adjacent orbit to the east from a vantage point on the celestial body so that together the plurality of satellites follow a serpentine pattern over the celestial body.

The constellation may include between two and twelve satellites, or more specifically between four and seven satellites. Each satellite may reside in a different orbit. The particular form of the serpentine pattern may be a function of the spacing between the orbits as measured by the angular spacing between an ascending node of each orbit. The spacing between the orbits as measured by the angular spacing between an ascending node of each orbit is between 30 and 60 degrees. Each orbit may be spaced apart by approximately 45 degrees. The particular form of the serpentine pattern may be a function of a magnitude of the incremental offsets in the starting true anomaly of each satellite. The magnitude of the incremental offsets in the starting true anomaly of each satellite may be between 40 and 80 degrees. The magnitude of the incremental offsets in the starting true anomaly of each satellite may be approximately 60 degrees. The lead satellite may remain in constant communication with the next adjacent satellite, the last satellite may remain in constant communication with the previous adjacent satellite, and all intermediate satellites may remain in constant communication with both the next adjacent and the previous adjacent satellites. The plurality of satellites together may be a first group of satellites and the constellation may further include a second group of satellites similar to the first group except that the second group is displaced from the first group. The orbits may be prograde orbits. The orbits may be retrograde orbits.

Another aspect of the present invention relates to a satellite constellation including a pair of sub-constellations orbiting around a celestial body, the sub-constellations being offset from each other relative to a reference circle about the celestial body. Each sub-constellation includes a plurality of man-made satellites that are asymmetrically located relative to the celestial body along a plurality of orbits located at a substantially common altitude and having a substantially common inclination relative to the reference circle, each respective satellite having a starting true anomaly that is incrementally offset from the satellite in the next adjacent orbit, each satellite being at all times within line-of-sight of the satellite in the next adjacent orbit. Each of the plurality of satellites appear to follow the satellite in the next adjacent orbit to the east from a vantage point on the celestial body so that together the plurality of satellites follow a serpentine pattern over the celestial body. The pair of sub-constellations are symmetrically located relative to each other relative to the celestial body, while the total number of satellites in the pair of sub-constellations together are asymmetrically located relative to the celestial body.

Each satellite of a given sub-constellation may reside in a different orbit. Each satellite of a given sub-constellation may reside in the same orbit as a corresponding satellite in the other sub-constellation.

Another aspect of the present invention relates to a satellite constellation including a plurality of man-made satellites that are asymmetrically located relative to a celestial body along an equal plurality of separate orbits located at a substantially common altitude and having a substantially common inclination relative to a reference circle about the celestial body, each respective satellite having a starting true anomaly that is incrementally offset from the satellite in the next adjacent orbit, each satellite being at all times within line-of-sight of the satellite in the next adjacent orbit, wherein the plurality includes between two and seven satellites. Each of the plurality of satellites appear to follow the satellite in the next adjacent orbit to the east from a vantage point on the celestial body so that together the plurality of satellites follow a serpentine pattern over the celestial body, wherein the particular form of the serpentine pattern is a function of the spacing between the orbits as measured by the angular spacing between an ascending node of each orbit and a function of a magnitude of the incremental offsets in the starting true anomaly of each satellite. The lead satellite remains in constant communication with the next adjacent satellite, the last satellite remains in constant communication with the previous adjacent satellite, and all intermediate satellites remain in constant communication with both the next adjacent and the previous adjacent satellites.

Numerous additional features and advantages of the present invention will become apparent to those skilled in the art upon consideration of the further description that follows.

BRIEF DESCRIPTION OF THE DRAWINGS

FIG. 3 shows a constellation of satellites of the present invention and the ground tracks created thereby as they orbit around the earth.

FIG. 4 shows the area on the earth covered by the field of regard of the satellites of the constellation of FIG. 3 as they orbit about the earth.

FIG. 5 shows a series of views of the earth with the constellation of FIG. 3 moving past a selected ground point.

FIG. 8 shows an alternative embodiment of the present invention in which there are two constellations, symmetrically separated on the earth, with each having six satellites.

FIG. 9 shows another alternative embodiment in which the constellation of FIG. 3 is supplemented with four MEO satellites.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with satellite based radar (SBR) on satellites orbiting around the earth, it should be expressly understood that the present invention may be applicable to other applications where extended, continuous line-of-sight access between a constellation of satellites and a point on a celestial body is required/desired. In this regard, the following description of a constellation of man-made satellites orbiting around the earth is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
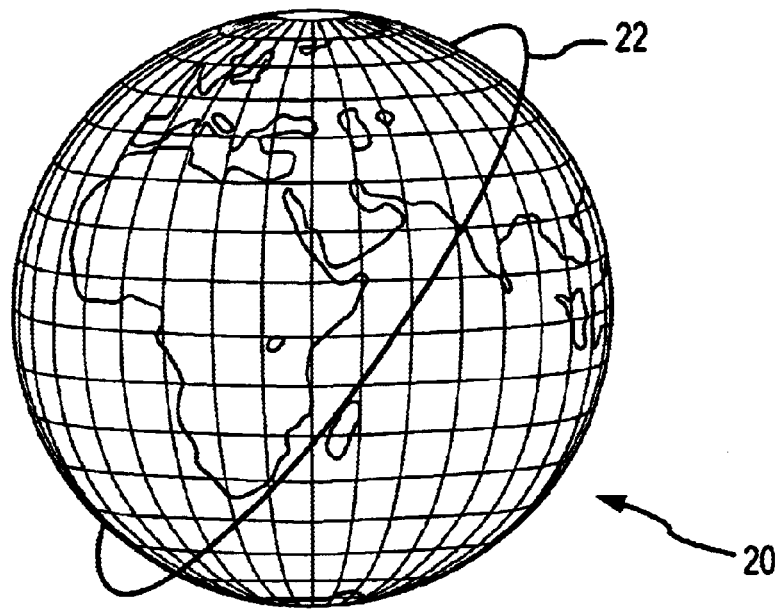
FIG. 1 is a three-dimensional view of the earth with an orbit for a man-made satellite therearound.
Figure 2:
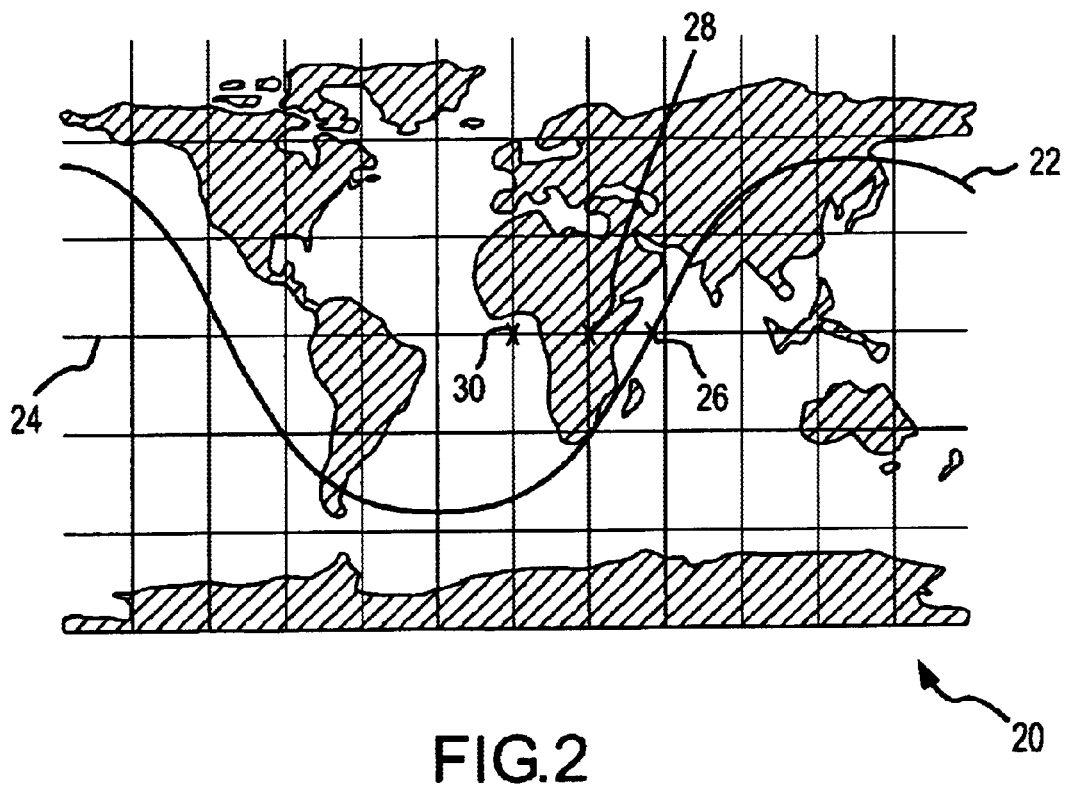
FIG. 2 is a two-dimensional projection view of the earth and the orbit of FIG. 1.

Prior to discussing the invention, an example is provided to clarify certain terminology herein. FIG. 1 shows a three-dimensional global view of the earth 20 and an orbit 22 around the earth. FIG. 2 shows a two-dimensional projection view of the earth with the orbit 22 superimposed thereon. The projection of the orbit onto the surface of the earth is known as the ground track and in FIG. 2 is coincidental with the orbit 22. In FIG. 2, an equator 24 of the earth is also shown. An X indicates the point on the orbit where a satellite moving on this orbit 22 would cross over the equator 24 in a direction moving from the southern hemisphere into the northern hemisphere. This point is known as the ascending node 26. The angle between the orbit plane as it crosses through the ascending node 26 with respect to the equator 24 is known as the inclination. In this example, the inclination is 54°. The inclination also determines the highest latitudinal point on the earth that the satellite's ground track reaches. In this case, that point is 54° of latitude. In other words, if a satellite's orbit had an inclination of 90°, it would cross over the north and south poles, while if a satellite's orbit had an inclination of 0° it would never leave the equator. Orbits with inclinations between 0° and 90° are known as prograde orbits and those with inclinations between 90° and 180° are known as retrograde orbits.

If not for the constant rotation of the earth, which causes a rotation of 360° in roughly 24 hours, a given satellite that began in this orbit would continually repeat the orbit shown in FIGS. 1 and 2. Of course, the earth does rotate in an easterly direction. Due to this rotation, the ground track from the orbiting satellite does not continue to follow the orbit 22 shown in FIG. 2. Instead, the ascending node 26 in the next subsequent orbit will cross at the point 28 shown to the west of the ascending node 26. On the next subsequent orbit, the ground track will cross on the point 30 shown to the west of the point 28. In this manner, it can be appreciated that the entire ground track of the satellite will move incrementally westward on each subsequent orbit. The incremental amount of movement of the ground track for each orbit is a function of the angular speed of the satellite in the orbit, and thus is a function of the altitude of the satellite. In this example, a prograde, low earth circular orbit of 1,000 kilometers is assumed. While a particular inclination angle and altitude are used in this and subsequent examples herein, the invention is not limited to this particular inclination angle or altitude.

A first embodiment of the satellite positioning system of the present invention is shown in FIGS. 3A–3D. In this two-dimensional projection of the earth 20 shown in FIG. 3A, six satellites and their respective fields of regard are shown. First, a lead satellite 40 and its field of regard (FOR) 42 are shown, followed by a first trailing satellite 44 and its respective FOR 46, followed next by another trailing satellite 48 and its FOR 50, followed by another trailing satellite 52 and its FOR 54, followed by another trailing satellite 56 and its FOR 58, then followed by the last trailing satellite 60 and its FOR 62. The FORs may be the area that could be seen by space-based radar (SBR) that may be located on the satellites to perform such functions as determining Ground Moving Target Indication (GMTI) data, for example. FIG. 3B shows these six satellites at a subsequent time in their respective orbits (roughly 30 minutes later). The ground tracks for each of the six satellites showing the path covered by those satellites since the position they were in FIG. 3A is also shown. Again a prograde, low earth orbit with a 54 inclination and a 1,000 km circular altitude is assumed, although the invention is not limited to such orbits. For example, retrograde orbits and orbits at a different altitude could also be used. FIG. 3C shows the same six satellites approximately 30 minutes after their position in FIG. 3B. Similarly, FIG. 3D shows the six satellites another 30 minutes later. It can be appreciated from FIGS. 3A–3D that the first trailing satellite 44 appears to generally follow the lead satellite 40, while the second trailing satellite 48 generally follows the first trailing satellite 44, the third trailing satellite 52 generally follows the second trailing satellite 48, the fourth trailing satellite 56 generally follows the third trailing satellite 52, and the last trailing satellite 60 generally follows the fourth trailing satellite 56. As can be appreciated, the group of satellites appears to move in a generally serpentine manner across the earth 20. Note also that the satellites are each positioned sufficiently far apart so that each FOR only slightly overlaps the FOR of other satellites. Most importantly, each satellite always remains within close enough proximity of its lead and trailing satellites to maintain line of sight communications therebetween.

The inventor refers to this new type of constellation as a "Wolfpack" satellite positioning scheme. This scheme produces a coordinated pattern of satellites with unique collection opportunities and extended communication reach based on resultant motion of the satellites in different orbital positions with specific relationships. Rather than a rigid definition of satellite populations, distributions, and separations, a characteristic relationship between the satellites established. These include separate, but closely-spaced, orbital planes and an incremental offset in the true anomalies of each satellite. The satellites appear to move along in a snake-like (lead/trail-type) fashion moving north, then south, then north, then south, and so on, within a relatively small longitudinal span to saturate a latitudinal band while the eastern component of its orbital motion provides a drift to the east or longitudinal spread of the access pattern about the earth. Of course, for retrograde orbits, the western component of the orbital motion would provide a drift to the west of the access pattern about the earth.

In this example, the satellites are placed in these positions by starting them in orbits separated by 45° and with true anomalies that are offset from each other by 60°. The actual numbers are detailed in Table 1 below.

TABLE 1

| SAT # | LONG NODE | TRUE ANOMALY |
|---|---|---|
| 40 | 045E | 300 deg |
| 44 | 000E | 000 deg |
| 48 | 315E | 060 deg |
| 52 | 270E | 120 deg |
| 56 | 225E | 180 deg |
| 60 | 180E | 240 deg |

FIGS. 4A–4D show these same six satellites 40, 44, 48, 52, 56, and 60 moving through the same positions as described above with respect to FIGS. 3A–3D. In this illustration, however, instead of showing the ground track covered by each respective satellite, the area covered by the FOR of each satellite is shown blacked out so that it can be appreciated that in slightly more than 90 minutes literally every point on the earth (less the regions around the north and south poles) has been covered by the FOR of at least one satellite.

FIGS. 5A–5L show the six satellite constellation described in conjunction with FIGS. 3 and 4 as they move past a ground point that may be of interest. In this case, a ground point designated by a white cross 66 represents the city of Belgrade, Yugoslavia. As can be seen in FIG. 5A, the first satellite to have Belgrade come within its FOR is the first trailing satellite 44 at time designated in FIG. 5A as 00. FIG. 5B shows the constellation five minutes later when Belgrade is still within the FOR of the first trailing satellite 44. FIG. 5C shows the position of the constellation after another five-minute period has passed. At this point, ten minutes after Belgrade first came within the FOR of the first trailing satellite 44, Belgrade is also now near the edge of the FOR of the second trailing satellite 48. FIG. 5D shows the position of the constellation after another five minutes has passed. In this position, Belgrade is still within the FOR of the second trailing satellite 48 and is near the boundary of the first trailing satellite 44. FIG. 5E is a repeat of FIG. 5D carried onto the next horizontal line for easy comparison with FIG. 5F. FIG. 5F shows the position of the constellation after another five-minute period has passed. At this position, 20 minutes subsequent to the position reflected in FIG. 5A, Belgrade has come within the FOR of the third trailing satellite 52 and still remains within the FOR of the second trailing satellite 48. FIG. 5G shows the position of the constellation after another five minutes have passed. In this position, 25 minutes after the constellation first came within sight of Belgrade, the city is still within the FOR of the third trailing satellite 52 and is near the boundary of the second trailing satellite 48. FIG. 5H shows the position of the constellation after another five-minute period. In this position, 30 minutes after the constellation first acquired Belgrade, Belgrade remains within the FOR of the third trailing satellite 52 and is now at the FOR boundary of the fourth trailing satellite 56. FIG. 5I is a duplicate of FIG. 5H and illustrates the satellite in the same position for comparison with FIG. 5J. FIG. 5J shows the position of the constellation after another five minutes has passed. In this position, 35 minutes after the constellation first acquired Belgrade, the city is still within the FOR of the fourth trailing satellite 56 and appears to have just left the FOR of the third trailing satellite 52. FIG. 5K shows the position of the constellation following another five-minute period. In this position, 40 minutes after initial acquisition, Belgrade remains within the FOR of the fourth trailing satellite 56. Finally, in FIG. 5L, 43 minutes after the constellation first acquired Belgrade, the city is at the boundary of the FOR of the fourth trailing satellite 56.

In this example, Belgrade never came within the FOR of the lead satellite 40, or the last trailing satellite 60. Of course, this is not a limitation of the invention. As can be appreciated, at least one of the satellites in the constellation was able to "see" Belgrade at all times for a continuous 43-minute period. It can also be appreciated that if only one satellite had been available, or if there were multiple satellites in a symmetrical pattern equally-spaced about the earth, the continuous access time for Belgrade would have been in the range of 15 minutes. This improvement in continuous, contiguous access of a given ground point from 15 minutes to 43 minutes can be very significant. For example, it may greatly improve the ability to collect GMTI data, including the use of sequential handoffs between adjacent satellites. Furthermore, during that 43 minute period there were approximately 14 minutes during which the ground point could be seen by two satellites at once. This effectively provides 57 minutes of viewing for some applications.

Figure 6:
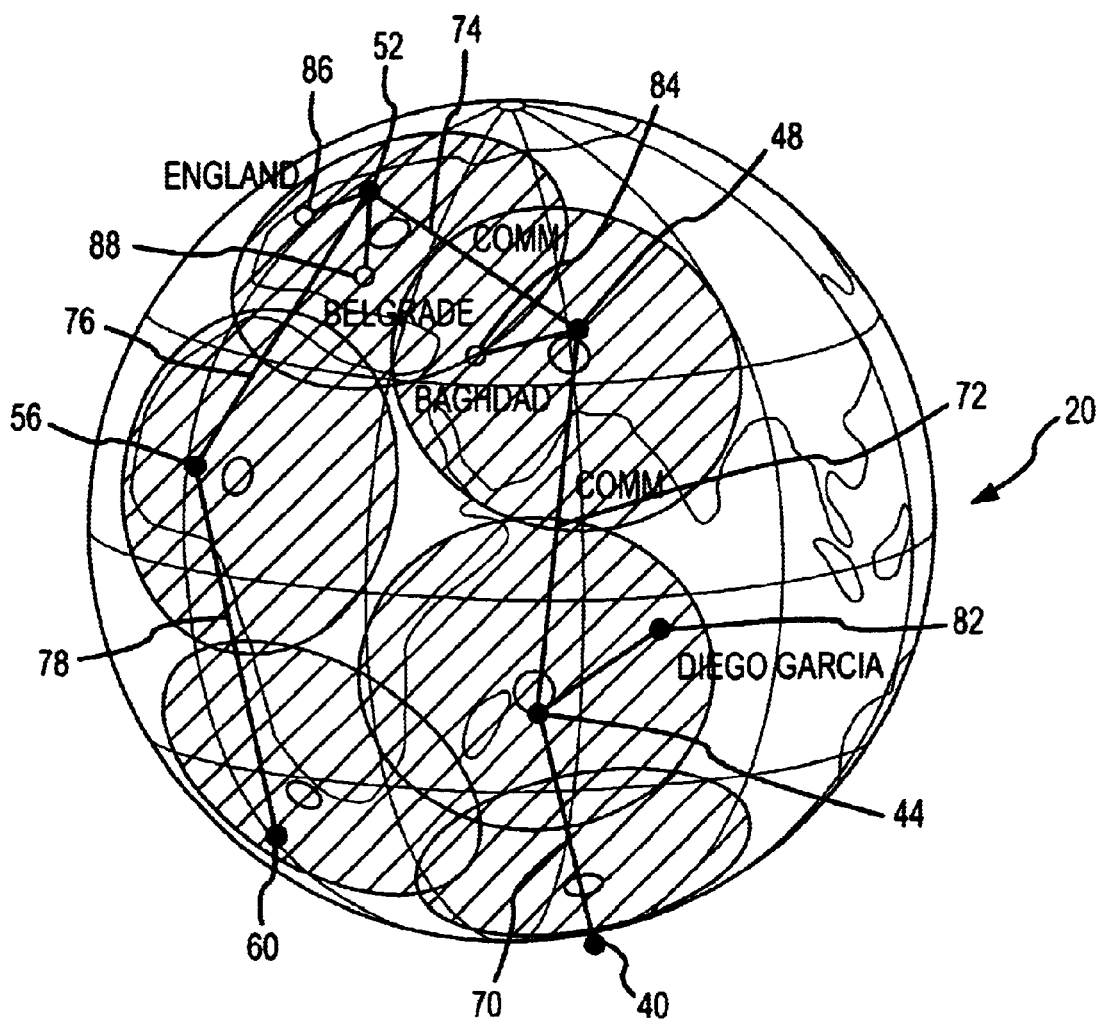
FIG. 6 is a three-dimensional view of the earth showing the satellites of the constellation shown in FIG. 3 in communication with each other and with selected ground communication sites.

The communication system existing between the satellites of the constellation of the present invention is shown in FIG. 6. These same six satellites 40, 44, 48, 52, 56, and 60 are shown in their characteristic pattern of the earth 20. A respective FOR for each of the satellites is also shown. At the center of each FOR is a white circle designating the point on the earth's surface directly below the respective satellite. A communication link 70 is shown between the lead satellite 40 and the first trailing satellite 44. A second communication link 72 is shown between the first trailing satellite 44 and the second trailing satellite 48. A third communication link 74 is shown between the second trailing satellite 48 and the third trailing satellite 52. A fourth communication link 76 is shown between the third trailing satellite 52 and the fourth trailing satellite 56. A fifth communication link 78 is shown between the fourth trailing satellite 56 and the last trailing satellite 60. Since each satellite will always be within line-of-sight of the next trailing or preceding satellite, constant communication can be maintained between those satellites. This communication between satellites can include data collected about a ground target, requests for assistance in processing such data, command and control information to and from ground communication sites (including commands to store information until a designated user can access it), information relayed between different users on the ground, and/or communications with other space vehicles. The communication links enable control by users located at a significant standoff distance from the collection area. These include fore and aft communication links.

For example, in the illustration of FIG. 6, the first trailing satellite 44 communicates with a ground communication site 82 located in the Indian Ocean at Diego Garcia. Meanwhile, the second trailing satellite 48 may be viewing a ground target in the vicinity of Baghdad 84. In addition, the third trailing satellite 52 is communicating with the ground communications site in England 86 while at the same time viewing a ground target in the vicinity of Belgrade 88. Via the communication links 72 and 74, the information collected in the vicinity of Baghdad 84 by the second trailing satellite 48 can be provided to a user at a ground communications site located in Diego Garcia 82 (via the first trailing satellite 44) and/or a user at a ground communications site in England 86 (via the third trailing satellite 52), respectively. Similarly, either of the ground communication sites 82 and 86 could access data collected by the third trailing satellite 52 about the ground target in the vicinity of the ground target in the vicinity of Belgrade 88. In a similar fashion, it can be appreciated that the data collected by any of the six satellites in the constellation can be communicated to a user in communication with any of that same or any of the other satellites. Intermittently there may also be communication paths between others of the satellites.

Figure 7:
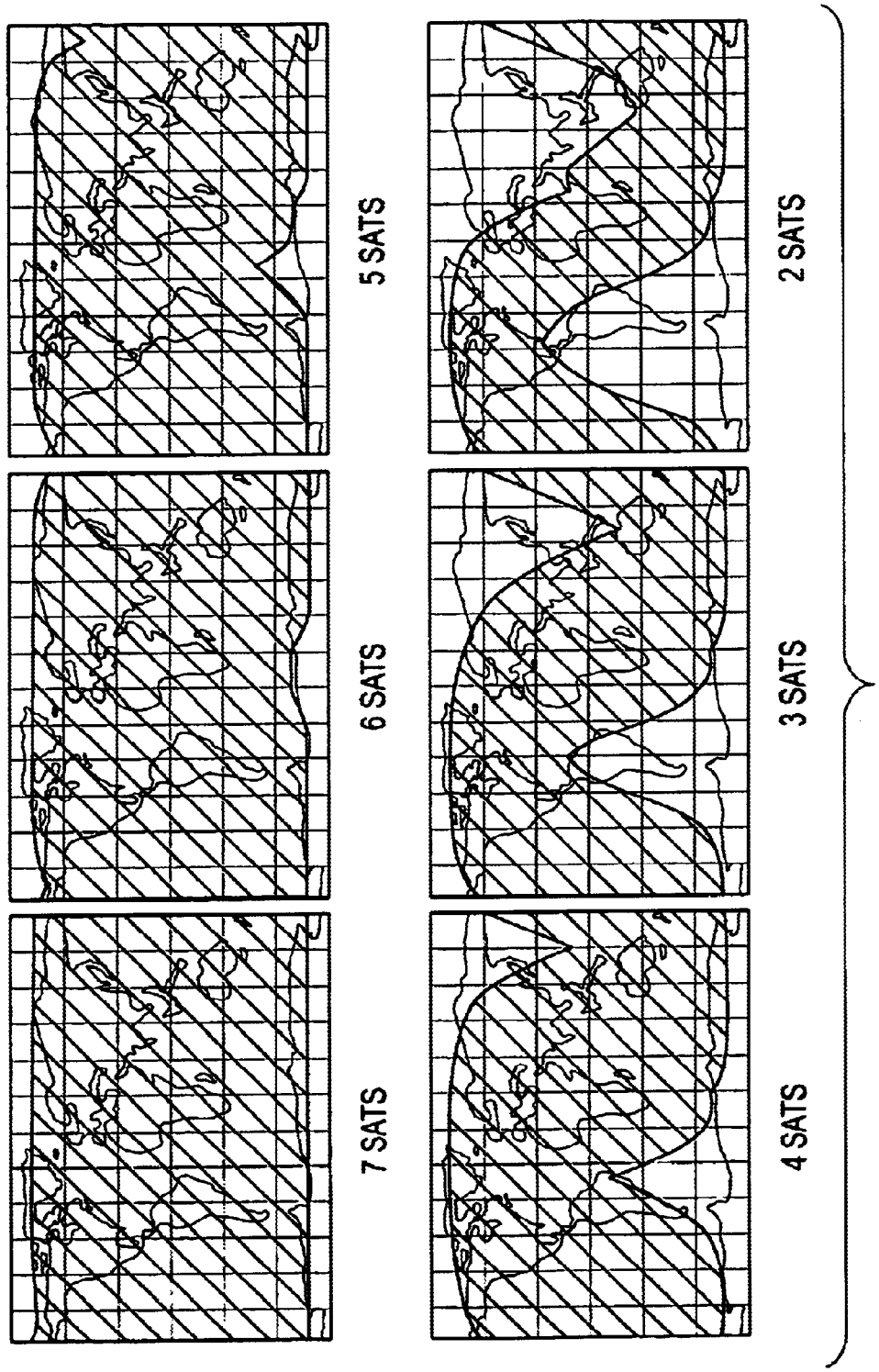
FIG. 7 is an illustration of the coverage of the fields of regard of the satellites of the constellation of FIG. 3, showing how the coverage varies depending on the number of satellites in the constellation.

The constellation described here includes six satellites. Of course, the present invention applies equally well to any number of satellites greater than two. As would be expected, the performance obtained by satellites with a varying number of satellites varies therewith. FIG. 7 and Table 2 illustrate this variation. As can be seen in FIG. 7A, a constellation of seven satellites arranged in a pattern as described above will entirely paint the globe in a single orbital path with the exception of the polar regions. Similarly, as shown in FIG. 7B, a constellation of six satellites comes very close to painting the same region as a constellation of seven satellites with the beginnings of a cusp formed at the bottom of the region painted. FIG. 7C shows the area painted with a constellation of only five satellites and it can be seen that small cusps are formed in both the northern and southern hemispheres. FIG. 7D illustrates the area painted by a constellation of four satellites in this type of pattern. As can be seen, the cusps are much greater than those formed in the constellation of five satellites. This trend is continued in FIG. 7E in which the area painted by three satellites is illustrated. In this case, the cusps are very significant and omit considerable portions of South America and northern Asia. Lastly, FIG. 7F shows the pattern painted by a constellation of two satellites arranged in the manner described above. As can be seen, nearly all of Asia and much of South and Central America are missed.

TABLE 2

| Wolfpack Size: | 7 | 6 | 5 | 4 | 3 | 2 |
|---|---|---|---|---|---|---|
| (Clock) Avg Day Access | 470.2 | 412.1 | 354.0 | 287.1 | 220.3 | 153.5 |
| (Stereo) Avg Day Access | 136.8 | 108.2 | 79.6 | 59.7 | 39.8 | 19.9 |
| (Effective) Avg Day Access | 607.0 | 520.3 | 433.6 | 346.8 | 260.1 | 173.4 |
| Maximum Access Gap | 85.2 | 93.7 | 104.3 | 330.2 | 455.5 | 680.5 |
| 90$^{th}$ Percentile Response | 65.0 | 69.0 | 75.0 | 128.0 | 307.0 | 478.0 |
| Average Response | 19.0 | 23.0 | 32.5 | 53.0 | 94.4 | 155.5 |

These results are also evidenced in Table 2 in which data for different constellations varying in number from two to seven is described. This data applies to a ground target at Belgrade's latitude. The first line of data provides the average number of minutes per 24-hour day that at least one satellite in the constellation can see a given ground point. The second line of Table 2 provides the average number of minutes within a 24-hour day that two satellites in the constellation can see a given ground point. The third line of Table 2 provides the average number of effective minutes in a 24-hour day that a satellite can see a given ground point. As can be appreciated, these numbers decrease as the number of satellites decrease. The fourth line in Table 2 provides the maximum number of minutes in the gap between access periods for any given ground point within the latitudinal band served by the constellation. The Maximum Access Gap is not significantly different between five, six, and seven satellites, but when the number of satellites is reduced to four the maximum gap increases dramatically. This follows the illustration in FIG. 7 where it can be seen that the largest degradation in performance happens when decreasing the number of satellites from five to four. As can be appreciated, many daily average metrics are scaleable with constellation size, but revisit metrics show dramatic degradation as the constellation size drops below five satellites.

As can be appreciated the constellations of the present invention provide frequent, extended periods of continuous surveillance with moderate gap times between revisits. As will be discussed further below, once the number of satellites in a given constellation reaches six or seven satellites, the best way to enhance performance beyond this number may be to have a pair of symmetrically-spaced constellations as described above and as shown in FIG. 8. FIG. 8A shows the six-satellite constellation described above. FIG. 8B shows a second constellation, also having six satellites 100, 102, 104, 106, 108, and 110. The two constellations are generally 180° apart, longitudinally. Having a second identical constellation provides twice the operational use of the system while decreasing by half the maximum access gap.

Another variation of the original constellation described above would be to continue to add satellites or other constellations until a fully populated pattern is formed to provide unbroken communication and ability to monitor a given ground target.

Rather than completely filling a pattern, another way in which to extend the communication capability of the constellation would be to maintain a single constellation such as described above and add a number of additional satellites at MEO altitude. This configuration is illustrated in FIG. 9. FIG. 9A shows the six-satellite constellation previously described. FIG. 9B shows the same six-satellite constellation supplemented with four satellites 114, 116, 118, and 120 at MEO altitude. As can be seen, with the addition of the four MEO satellites, and communication links between those satellites and between those satellites and ground communication sites, as well as between the LEO constellation and at least one of the MEO satellites, communication can be provided from nearly the entire surface of the earth (within certain latitudinal constraints). Although not illustrated, with as few as three MEO satellites, global reach back to the continental United States should always be available.

Figure 10B:
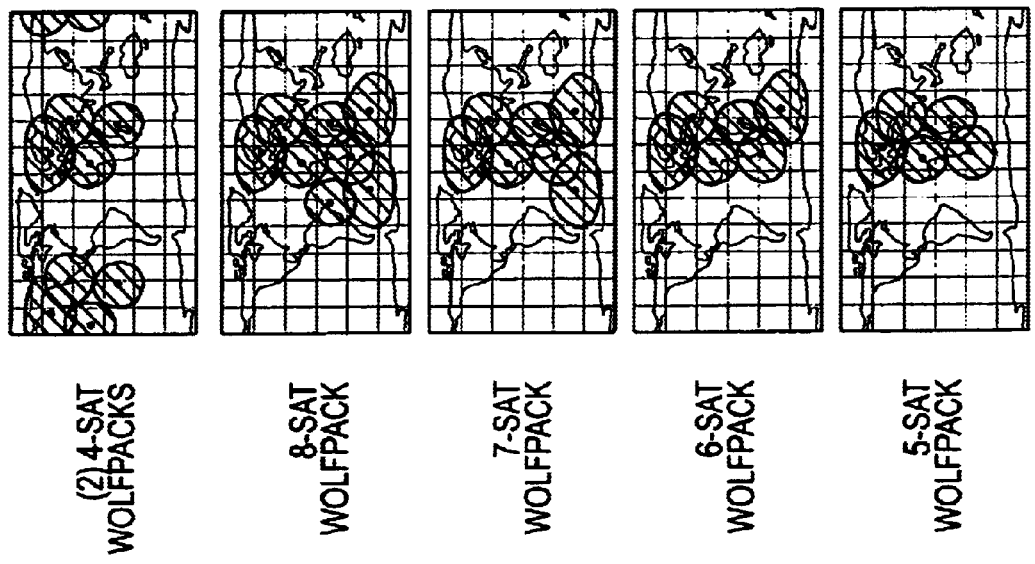
FIGS. 10A and 10B show the coverage and time to access for constellations having a different number of satellites, as well as two four-satellite descriptions.
Figure 10A:
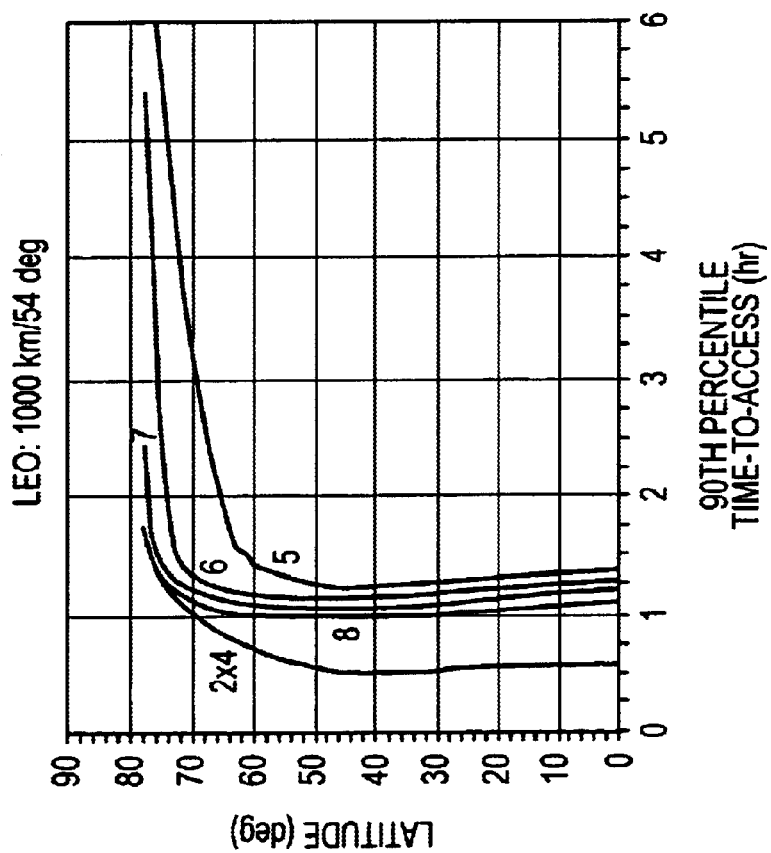

FIGS. 10A and 10B pictorially and graphically illustrate views achieved by adding satellites to a constellation and by having two constellations. FIG. 10A shows, with a low earth orbit of 1,000-kilometer circular altitude and a 54° inclination angle, the 90$^{th}$ percentile time to access, expressed in hours, as a function of latitude and numbers of satellites. As can be appreciated, there are not significant differences between five, six, seven, and eight satellites, but when two constellations of four satellites each are used, the time to access is greatly reduced. FIG. 10B shows constellations of these various sizes and multiple constellations.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A constellation of satellites, comprising:
   a plurality of man-made satellites that are asymmetrically located relative to a celestial body along a plurality of orbits located at a substantially common altitude and having a substantially common inclination relative to a reference circle about the celestial body, each respective satellite having a starting true anomaly that is incrementally offset from the satellite in the next adjacent orbit, each satellite being at all times within line-of-sight of the satellite in the next adjacent orbit;

wherein each of the plurality of satellites appear to follow the satellite in the next adjacent orbit to the east from a vantage point on the celestial body so that together the plurality of satellites follow a serpentine pattern over the celestial body.

2. A constellation as defined in claim 1, wherein the constellation includes between two and twelve satellites.

3. A constellation as defined in claim 2, wherein the constellation includes between four and seven satellites.

4. A constellation as defined in claim 1, wherein each satellite resides in a different orbit.

5. A constellation as defined in claim 1, wherein the particular form of the serpentine pattern is a function of the spacing between the orbits as measured by the angular spacing between an ascending node of each orbit.

6. A constellation as defined in claim 5, wherein the spacing between the orbits as measured by the angular spacing between the ascending node of each orbit is between 30 and 60 degrees.

7. A constellation as defined in claim 1, wherein each orbit is spaced apart by approximately 45 degrees.

8. A constellation as defined in claim 1, wherein the particular form of the serpentine pattern is a function of a magnitude of the incremental offsets in the starting true anomaly of each satellite.

9. A constellation as defined in claim 1, wherein a magnitude of the incremental offsets in the starting true anomaly of each satellite is between 40 and 80 degrees.

10. A constellation as defined in claim 1, wherein a magnitude of the incremental offsets in the starting true anomaly of each satellite is approximately 60 degrees.

11. A constellation as defined in claim 1, wherein there is a lead satellite, at least one intermediate satellite and a last satellite, and wherein the lead satellite remains in constant communication with the next adjacent satellite, the last satellite remains in constant communication with the previous adjacent satellite, and all intermediate satellites remain in constant communication with both the next adjacent and the previous adjacent satellites.

12. A constellation as defined in claim 1, wherein the plurality of satellites together are a first group of satellites and further including a second group of satellites similar to the first group except that the second group is displaced from the first group.

13. A constellation as defined in claim 1, wherein the orbits are prograde orbits.

14. A constellation as defined in claim 1, wherein the orbits are retrograde orbits.

15. A constellation of satellites, comprising:
a pair of sub-constellations orbiting around a celestial body, the sub-constellations being offset from each other relative to a reference circle about the celestial body, each sub-constellation including:
a plurality of man-made satellites that are asymmetrically located relative to the celestial body along a plurality of orbits located at a substantially common altitude and having a substantially common inclination relative to the reference circle, each respective satellite having a starting true anomaly that is incrementally offset from the satellite in the next adjacent orbit, each satellite being at all times within line-of-sight of the satellite in the next adjacent orbit;

wherein each of the plurality of satellites appear to follow the satellite in the next adjacent orbit to the east from a vantage point on the celestial body so that together the plurality of satellites follow a serpentine pattern over the celestial body;

wherein the pair of sub-constellations are symmetrically located relative to each other relative to the celestial body, while the total number of satellites in the pair of sub-constellations together are asymmetrically located relative to the celestial body.

16. A constellation as defined in claim 15, wherein each sub-constellation includes between two and twelve satellites.

17. A constellation as defined in claim 16, wherein each sub-constellation includes between four and seven satellites.

18. A constellation as defined in claim 15, wherein each satellite of a given sub-constellation resides in a different orbit.

19. A constellation as defined in claim 18, wherein each satellite of a given sub-constellation resides in the same orbit as a corresponding satellite in the other sub-constellation.

20. A constellation as defined in claim 15, wherein the particular form of the serpentine pattern of each sub-constellation is a function of the spacing between the orbits as measured by the angular spacing between an ascending node of each orbit.

21. A constellation as defined in claim 20, wherein the spacing between the orbits as measured by the angular spacing between an ascending node of each orbit is between 30 and 60 degrees.

22. A constellation as defined in claim 15, wherein each orbit is spaced apart by approximately 45 degrees.

23. A constellation as defined in claim 15, wherein the particular form of the serpentine pattern is a function of a magnitude of the incremental offsets in the starting true anomaly of each satellite.

24. A constellation as defined in claim 15, wherein a magnitude of the incremental offsets in the starting true anomaly of each satellite is between 40 and 80 degrees.

25. A constellation as defined in claim 15, wherein a magnitude of the incremental offsets in the starting true anomaly of each satellite is approximately 60 degrees.

26. A constellation as defined in claim 15, wherein within each sub-constellation there is a lead satellite, at least one intermediate satellite, and a last satellite, and wherein within each sub-constellation the lead satellite remains in constant communication with the next adjacent satellite, the last satellite remains in constant communication with the previous adjacent satellite, and all intermediate satellites remain in constant communication with both the next adjacent and the previous adjacent satellites.

27. A constellation as defined in claim 15, wherein the orbits are prograde orbits.

28. A constellation as defined in claim 15, wherein the orbits are retrograde orbits.

29. A constellation of satellites, comprising:
a plurality of man-made satellites that are asymmetrically located relative to a celestial body along an equal plurality of separate orbits located at a substantially common altitude and having a substantially common inclination relative to a reference circle about the celestial body, each respective satellite having a starting true anomaly that is incrementally offset from the satellite in the next adjacent orbit, each satellite being at all times within line-of-sight of the satellite in the next adjacent orbit, wherein the plurality includes between two and seven satellites;

wherein each of the plurality of satellites appear to follow the satellite in the next adjacent orbit to the east from a vantage point on the celestial body so that together the plurality of satellites follow a serpentine pattern over the celestial body, wherein the particular form of the serpentine pattern is a function of the spacing between the orbits as measured by the angular spacing between an ascending node of each orbit and a function of a magnitude of the incremental offsets in the starting true anomaly of each satellite; and wherein the lead satellite remains in constant communication with the next adjacent satellite, the last satellite remains in constant communication with the previous adjacent satellite, and all intermediate satellites remain in constant communication with both the next adjacent and the previous adjacent satellites.

30. A constellation as defined in claim 29, wherein the plurality of satellites together are a first group of satellites and further including a second group of satellites similar to the first group except that the second group is angularly displaced from the first group as measured by the ascending nodes of the satellites in each constellation.

* * * * *